(12) United States Patent
Honda

(10) Patent No.: US 7,693,086 B2
(45) Date of Patent: Apr. 6, 2010

(54) DATA TRANSFER CONTROL DEVICE AND ELECTRONIC INSTRUMENT

(75) Inventor: Hiroyasu Honda, Chino (JP)

(73) Assignee: Seiko Epson Corporation, Tokyo (JP)

( * ) Notice: Subject to any disclaimer, the term of this patent is extended or adjusted under 35 U.S.C. 154(b) by 1001 days.

(21) Appl. No.: 11/378,234

(22) Filed: Mar. 20, 2006

(65) Prior Publication Data
US 2006/0215703 A1  Sep. 28, 2006

(30) Foreign Application Priority Data
Mar. 24, 2005  (JP) .............................. 2005-086187

(51) Int. Cl.
*H04L 12/56* (2006.01)
(52) U.S. Cl. ...................... 370/252; 370/476
(58) Field of Classification Search ................. 345/204, 345/519; 710/100; 370/476
See application file for complete search history.

(56) References Cited

U.S. PATENT DOCUMENTS

| | | | | |
|---|---|---|---|---|
| 6,157,972 | A | * | 12/2000 | Newman et al. ............ 710/100 |
| RE37,944 | E | * | 12/2002 | Fielder et al. ............... 345/519 |
| 7,475,171 | B2 | | 1/2009 | Honda |
| 7,600,061 | B2 | | 10/2009 | Honda |
| 7,617,347 | B2 | | 11/2009 | Honda |
| 2002/0011998 | A1 | * | 1/2002 | Tamura ...................... 345/204 |
| 2002/0059488 | A1 | | 5/2002 | Ishida et al. |
| 2004/0167995 | A1 | | 8/2004 | Fujita et al. |

FOREIGN PATENT DOCUMENTS

| | | |
|---|---|---|
| EP | 1 389 761 A2 | 2/2004 |
| JP | A 2001-222249 | 8/2001 |
| JP | A-2004-139431 | 5/2004 |

* cited by examiner

*Primary Examiner*—Derrick W Ferris
*Assistant Examiner*—Stephen W Brown
(74) *Attorney, Agent, or Firm*—Oliff & Berridge, PLC

(57) ABSTRACT

A data transfer control device includes: an interface circuit to which data of which one data unit is K bits is input through an interface bus; and a link controller which generates a packet transmitted through a serial bus. The link controller includes: a data formatter which generates (N×I)-byte packed data containing M pieces of (K+L)-bit data obtained by adding L bits of dummy data to the K-bit data, the data formatter generating the packed data in which L and M are variably set corresponding to K; and a packet generation circuit which generates a packet in which the packed data is inserted in a data field.

18 Claims, 14 Drawing Sheets

FIG.3A  FIRST COMPARATIVE EXAMPLE

DATA
( K BITS )

| 10 | 1 | 2 | 3 | 4 | 5 | 6 | 7 | 8 |
|---|---|---|---|---|---|---|---|---|
|  | 101 | 102 | 103 | 104 | 105 | 106 | 107 | 108 |
|  | 109 | 110 | x | x | x | x | x | x |
|  | 201 | 202 | 203 | 204 | 205 | 206 | 207 | 208 |
|  | 209 | 210 | x | x | x | x | x | x |

FIG.3B  SECOND COMPARATIVE EXAMPLE

DATA
( K BITS )

| 10 | 101 | 102 | 103 | 104 | 105 | 106 | 107 | 108 |
|---|---|---|---|---|---|---|---|---|
|  | 109 | 110 | 201 | 202 | 203 | 204 | 205 | 206 |
|  | 207 | 208 | 209 | 210 | 301 | 302 | 303 | 304 |
|  | 305 | 306 | 307 | 308 | 309 | 310 | 401 | 402 |
|  | 403 | 404 | 405 | 406 | 407 | 408 | 409 | 410 |

FIG.4A  FIRST COMPARATIVE EXAMPLE

DATA
(K BITS)

| 10 | 1 | 2 | 3 | 4 | 5 | 6 | 7 | 8 | 9 | 10 | 11 | 12 | 13 | 14 | 15 | 16 |
|---|---|---|---|---|---|---|---|---|---|---|---|---|---|---|---|---|
|  | 101 | 102 | 103 | 104 | 105 | 106 | 107 | 108 | 109 | 110 | x | x | x | x | x | x |
|  | 201 | 202 | 203 | 204 | 205 | 206 | 207 | 208 | 209 | 210 | x | x | x | x | x | x |

FIG.4B  SECOND COMPARATIVE EXAMPLE

DATA
(K BITS)

| 10 | 101 | 102 | 103 | 104 | 105 | 106 | 107 | 108 | 109 | 110 | 201 | 202 | 203 | 204 | 205 | 206 |
|---|---|---|---|---|---|---|---|---|---|---|---|---|---|---|---|---|
|  | 207 | 208 | 209 | 210 | 301 | 302 | 303 | 304 | 305 | 306 | 307 | 308 | 309 | 310 | 401 | 402 |
|  | 403 | 404 | 405 | 406 | 407 | 408 | 409 | 410 | 501 | 502 | 503 | 504 | 505 | 506 | 507 | 508 |
|  | 509 | 510 | 601 | 602 | 603 | 604 | 605 | 606 | 607 | 608 | 609 | 610 | 701 | 702 | 703 | 704 |
|  | 705 | 706 | 707 | 708 | 709 | 710 | A01 | A02 | A03 | A04 | A05 | A06 | A07 | A08 | A09 | A10 |

FIG.8

| DATA (K BITS) | PW (N BYTES) | PCS (M) | 1 | 2 | 3 | 4 | 5 | 6 | 7 | 8 | |
|---|---|---|---|---|---|---|---|---|---|---|---|
| 6 | 24 (N=3) | 4 | 11 | 12 | 13 | 14 | 15 | 16 | 21 | 22 | |
| | | | 23 | 24 | 25 | 26 | 31 | 32 | 33 | 34 | ◄~ A1 |
| | | | 35 | 36 | 41 | 42 | 43 | 44 | 45 | 46 | |
| 7 | 16 (N=2) | 2 | 11 | 12 | 13 | 14 | 15 | 16 | 17 | x | |
| | | | 21 | 22 | 23 | 24 | 25 | 26 | 27 | x | ◄~ A2 |
| 8 | 16 (N=2) | 2 | 11 | 12 | 13 | 14 | 15 | 16 | 17 | 18 | |
| | | | 21 | 22 | 23 | 24 | 25 | 26 | 27 | 28 | ◄~ A3 |
| 10 | 24 (N=3) | 2 | 101 | 102 | 103 | 104 | 105 | 106 | 107 | 108 | |
| | | | 109 | 110 | x | x | 201 | 202 | 203 | 204 | ◄~ A4 |
| | | | 205 | 206 | 207 | 208 | 209 | 210 | x | x | |
| 12 | 24 (N=3) | 2 | 101 | 102 | 103 | 104 | 105 | 106 | 107 | 108 | |
| | | | 109 | 110 | 111 | 112 | 201 | 202 | 203 | 204 | ◄~ A5 |
| | | | 205 | 206 | 207 | 208 | 209 | 210 | 211 | 212 | |
| 16 | 16 (N=2) | 1 | 101 | 102 | 103 | 104 | 105 | 106 | 107 | 108 | |
| | | | 109 | 110 | 111 | 112 | 113 | 114 | 115 | 116 | ◄~ A6 |
| 24 | 24 (N=3) | 1 | 101 | 102 | 103 | 104 | 105 | 106 | 107 | 108 | |
| | | | 109 | 110 | 111 | 112 | 113 | 114 | 115 | 116 | ◄~ A7 |
| | | | 117 | 118 | 119 | 120 | 121 | 122 | 123 | 124 | |

FIG.9

| DATA (K BITS) | PW ("N×2" BYTES) | PCS (M) | 1 | 2 | 3 | 4 | 5 | 6 | 7 | 8 | 9 | 10 | 11 | 12 | 13 | 14 | 15 | 16 | |
|---|---|---|---|---|---|---|---|---|---|---|---|---|---|---|---|---|---|---|---|
| 6 | 48 (N=3) | 8 | 11 35 63 | 12 36 64 | 13 41 65 | 14 42 66 | 15 43 71 | 16 44 72 | 21 45 73 | 22 46 74 | 23 51 75 | 24 52 76 | 25 53 81 | 26 54 82 | 31 55 83 | 32 56 84 | 33 61 85 | 34 62 86 | ⤶ B1 |
| 7 | 32 (N=2) | 4 | 11 31 | 12 32 | 13 33 | 14 34 | 15 35 | 16 36 | 17 37 | x x | 21 41 | 22 42 | 23 43 | 24 44 | 25 45 | 26 46 | 27 47 | x x | ⤶ B2 |
| 8 | 32 (N=2) | 4 | 11 31 | 12 32 | 13 33 | 14 34 | 15 35 | 16 36 | 17 37 | 18 38 | 21 41 | 22 42 | 23 43 | 24 44 | 25 45 | 26 46 | 27 47 | 28 48 | ⤶ B3 |
| 10 | 32 (N=2) | 3 | 101 206 | 102 207 | 103 208 | 104 209 | 105 210 | 106 x | 107 301 | 108 302 | 109 303 | 110 304 | x 305 | 201 306 | 202 307 | 203 308 | 204 309 | 205 310 | ⤶ B4 |
| 12 | 48 (N=3) | 4 | 101 205 309 | 102 206 310 | 103 207 311 | 104 208 312 | 105 209 401 | 106 210 402 | 107 211 403 | 108 212 404 | 109 301 405 | 110 302 406 | 111 303 407 | 112 304 408 | 201 305 409 | 202 306 410 | 203 307 411 | 204 308 412 | ⤶ B5 |
| 16 | 32 (N=2) | 2 | 101 201 | 102 202 | 103 203 | 104 204 | 105 205 | 106 206 | 107 207 | 108 208 | 109 209 | 110 210 | 111 211 | 112 212 | 113 213 | 114 214 | 115 215 | 116 216 | ⤶ B6 |
| 24 | 48 (N=3) | 2 | 101 117 209 | 102 118 210 | 103 119 211 | 104 120 212 | 105 121 213 | 106 122 214 | 107 123 215 | 108 124 216 | 109 201 217 | 110 202 218 | 111 203 219 | 112 204 220 | 113 205 221 | 114 206 222 | 115 207 223 | 116 208 224 | ⤶ B7 |

FIG.11A  FIRST COMPARATIVE EXAMPLE (M IS FIXED AT "1")

| N | L | K | M |
|---|---|---|---|
| 1 | 2 | 6 | 1 |
| 1 | 1 | 7 | 1 |
| 1 | 0 | 8 | 1 |
| 2 | 6 | 10 | 1 |
| 2 | 4 | 12 | 1 |
| 2 | 0 | 16 | 1 |
| 3 | 0 | 24 | 1 |

FIG.11B  SECOND COMPARATIVE EXAMPLE (L IS FIXED AT "0")

| N | L | K | M |
|---|---|---|---|
| 3 | 0 | 6 | 4 |
| 7 | 0 | 7 | 8 |
| 1 | 0 | 8 | 1 |
| 5 | 0 | 10 | 4 |
| 3 | 0 | 12 | 2 |
| 2 | 0 | 16 | 1 |
| 3 | 0 | 24 | 1 |

FIG.11C  EMBODIMENT (L AND M ARE VARIABLY SET CORRESPONDING TO K)

| N(PW) | L(DUMMY DATA) | K(DATA) | M(PCS) |
|---|---|---|---|
| 3 | 0 | 6 | 4 |
| 2 | 1 | 7 | 2 |
| 2 | 0 | 8 | 2 |
| 3 | 2 | 10 | 2 |
| 3 | 0 | 12 | 2 |
| 2 | 0 | 16 | 1 |
| 3 | 0 | 24 | 1 |

N × 8 = (K + L) × M
(I = 1)

FIG.12A  FIRST COMPARATIVE EXAMPLE (M IS FIXED AT "1")

| N | L | K | M |
|---|---|---|---|
| 1 | 10 | 6 | 1 |
| 1 | 9 | 7 | 1 |
| 1 | 8 | 8 | 1 |
| 1 | 6 | 10 | 1 |
| 1 | 4 | 12 | 1 |
| 1 | 0 | 16 | 1 |
| 2 | 8 | 24 | 1 |

FIG.12B  SECOND COMPARATIVE EXAMPLE (L IS FIXED AT "0")

| N | L | K | M |
|---|---|---|---|
| 3 | 0 | 6 | 8 |
| 7 | 0 | 7 | 16 |
| 1 | 0 | 8 | 2 |
| 5 | 0 | 10 | 8 |
| 3 | 0 | 12 | 4 |
| 1 | 0 | 16 | 1 |
| 3 | 0 | 24 | 2 |

FIG.12C  EMBODIMENT (L AND M ARE VARIABLY SET CORRESPONDING TO K)

| N(PW) | L(DAMMY DATA) | K( DATA ) | M(PCS) |
|---|---|---|---|
| 3 | 0 | 6 | 8 |
| 2 | 1 | 7 | 4 |
| 2 | 0 | 8 | 4 |
| 2 | 1 | 10 | 3 |
| 3 | 0 | 12 | 4 |
| 2 | 0 | 16 | 2 |
| 3 | 0 | 24 | 2 |

$N \times 8 \times 2 = (K+L) \times M$
$(I=2)$

DATA TRANSFER CONTROL DEVICE AND ELECTRONIC INSTRUMENT

Japanese Patent Application No. 2005-86187, filed on Mar. 24, 2005, is hereby incorporated by reference in its entirety.

BACKGROUND OF THE INVENTION

The present invention relates to a data transfer control device and an electronic instrument.

In recent years, a high-speed serial transfer interface such as a low voltage differential signaling (LVDS) interface has attracted attention as an interface aiming at reducing EMI noise or the like. In such a high-speed serial transfer, data is transferred by causing a transmitter circuit to transmit serialized data using differential signals and causing a receiver circuit to differentially amplify the differential signals (JP-A-2001-222249).

An ordinary portable telephone includes a first instrument section provided with buttons for inputting a telephone number or a character, a second instrument section provided with a main liquid crystal display (LCD), a sub LCD, and a camera (CCD), and a connection section (e.g. hinge) which connects the first and second instrument sections. The number of interconnects passing through the connection section can be reduced by transferring data between a first substrate provided in the first instrument section and a second substrate provided in the second instrument section by serial transfer using differential signals.

The format of camera data output from a camera (imaging device) such as a CCD or CMOS is various. Specific examples of such formats include YUV422, YUV420, RGB888, RGB565, RGB444, RAW6, RAW7, RAW8, RAW10, RAW12, and JPEG8. YUV422 data and YUV420 data are input as 8-bit data (data of which one data unit is eight bits). RGB888 data is input as 24-bit data, RGB565 data is input as 16-bit data, and RGB444 data is input as 12-bit data. RAW6 data, RAW7 data, RAW8 data, RAW10 data, and RAW12 data are respectively input as 6-bit data, 7-bit data, 8-bit data, 10-bit data, and 12-bit data, and JPEG8 data is input as 8-bit data. Therefore, it is desirable that such various formats be supported when packetizing camera data and serially transferring the packetized data from the second instrument section provided with the camera to the first instrument section provided with a host device.

However, if the number of bits of redundant data is increased when packetizing camera data in various formats, the amount of data transferred through the serial bus is increased. On the other hand, a problem such as an increase in the circuit scale occurs when dealing with various formats while setting the number of bits of redundant data at zero.

SUMMARY

A first aspect of the invention relates to a data transfer control device which controls data transfer, the data transfer control device comprising:

an interface circuit to which data of which one data unit is K bits (K is an integer of two or more) is input through an interface bus; and a link controller which generates a packet transmitted through a serial bus, the link controller including:

a data formatter which generates (N×I)-byte (N and I are integers of one or more) packed data containing M (M is an integer of one or more) pieces of (K+L)-bit data obtained by adding L bits (L is an integer of zero or more) of dummy data to the K-bit data, the data formatter generating the packed data in which L and M are variably set corresponding to K; and a packet generation circuit which generates a packet in which the packed data is inserted in a data field as the packet transmitted through the serial bus.

A second aspect of the invention relates to an electronic instrument comprising:

the above data transfer control device; and one or more devices connected with the data transfer control device through the interface bus.

A third aspect of the invention relates to a data transfer control device which controls data transfer, the data transfer control device comprising:

an interface circuit which performs interface processing between the data transfer control device and a host device connected with the data transfer control device through a system bus; and a link controller which analyzes a packet received through a serial bus and outputs data of which one data unit is K bits (K is an integer of two or more) to the interface circuit, (N×I)-byte (N and I are integers of one or more) packed data, which contains M (M is an integer of one or more) pieces of (K+L)-bit data obtained by adding L bits (L is an integer of zero or more) of dummy data to the K-bit data and in which L and M are variably set corresponding to K, being inserted in a data field of the packet received through the serial bus; and the link controller including a data formatter which extracts the K-bit data from the packed data and outputs the extracted K-bit data to the interface circuit.

A fourth aspect of the invention relates to an electronic instrument comprising:

the above data transfer control device; and the host device connected with the data transfer control device through the system bus.

BRIEF DESCRIPTION OF THE SEVERAL VIEWS OF THE DRAWING

FIGS. 3A and 3B are illustrative of methods of comparative examples.

FIGS. 4A and 4B are illustrative of methods of comparative examples.

FIG. 8 is illustrative of a format conversion method according to one embodiment of the invention.

FIG. 9 is illustrative of a format conversion method according to one embodiment of the invention.

FIGS. 11A, 11B, and 11C are illustrative of an advantage of one embodiment of the invention.

FIGS. 12A, 12B, and 12C are illustrative of an advantage of one embodiment of the invention.

DETAILED DESCRIPTION OF THE EMBODIMENT

Figure 1:
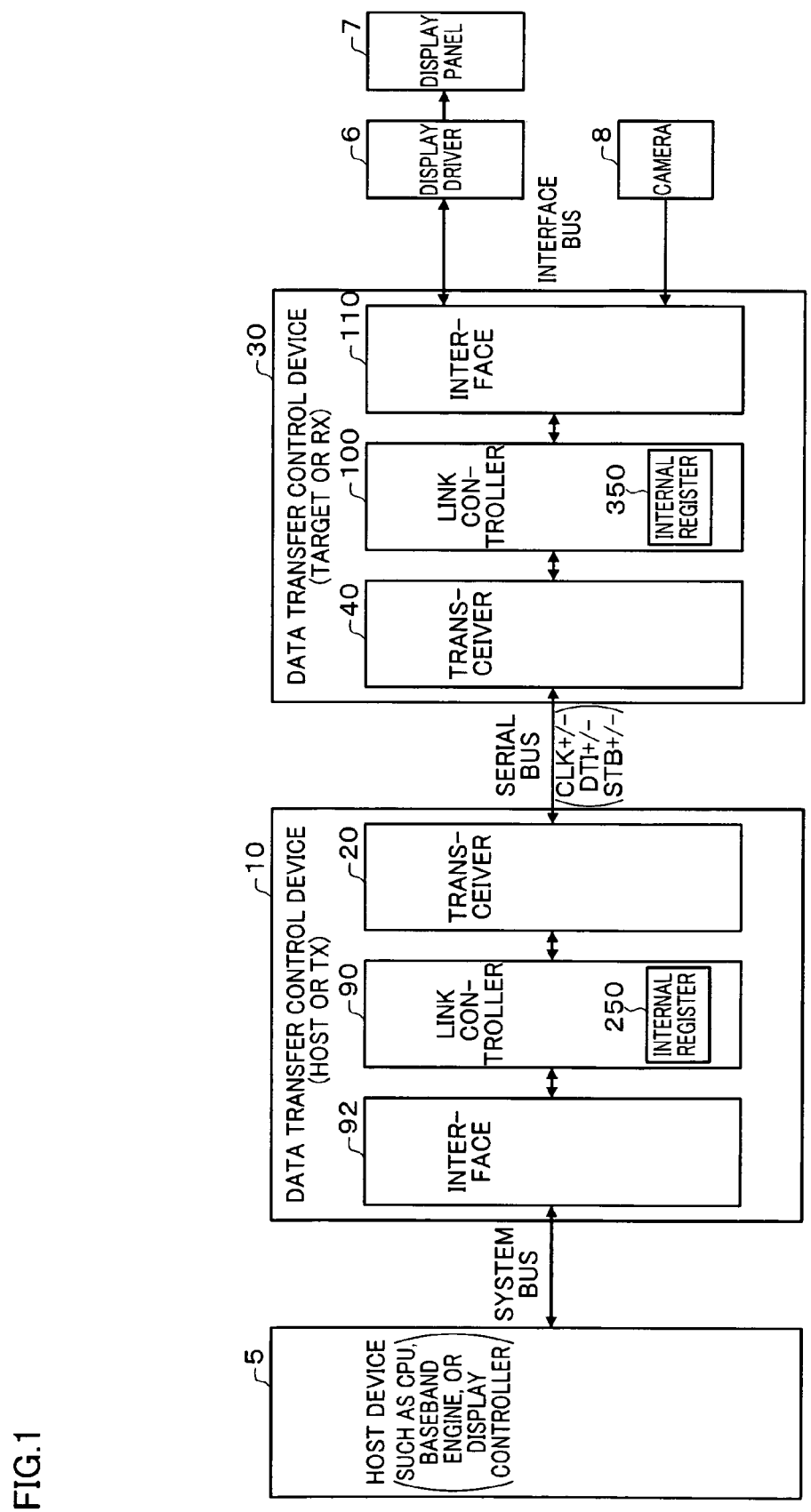
FIG. 1 shows a data transfer control device according to one embodiment of the invention and a system configuration example of the data transfer control device.

The invention may provide a data transfer control device which can realize an efficient transfer of data in various formats while preventing an increase in the circuit scale, and an electronic instrument including the same.

One embodiment of the invention provides a data transfer control device which controls data transfer, the data transfer control device comprising:

an interface circuit to which data of which one data unit is K bits (K is an integer of two or more) is input through an interface bus; and a link controller which generates a packet transmitted through a serial bus, the link controller including:

a data formatter which generates (N×I)-byte (N and I are integers of one or more) packed data containing M (M is an integer of one or more) pieces of (K+L)-bit data obtained by adding L bits (L is an integer of zero or more) of dummy data to the K-bit data, the data formatter generating the packed data in which L and M are variably set corresponding to K; and a packet generation circuit which generates a packet in which the packed data is inserted in a data field as the packet transmitted through the serial bus.

According to one embodiment of the invention, the (N×I)-byte packed data is generated which contains M pieces of (K+L)-bit data obtained by adding L bits of dummy data to the K-bit data and in which L and M are variably set corresponding to K. The packed data is inserted (set) in the data field of the packet transmitted through the serial bus. The amount of data transferred through the serial bus can be reduced by variably setting L of the packed data corresponding to K. An increase in the circuit scale can be prevented by variably setting M of the packed data corresponding to K. Therefore, one embodiment of the invention can realize an efficient serial transfer of data in various formats while preventing an increase in the circuit scale.

With this embodiment,
the data formatter may generate the packed data in which
"L=0", "M=4", and "N=3" when "K=6" and "I=1", or
"L=1", "M=2", and "N=2" when "K=7" and "I=1", or
"L=0", "M=2", and "N=2" when "K=8" and "I=1", or
"L=2", "M=2", and "N=3" when "K=10" and "I=1", or
"L=0", "M=2", and "N=3" when "K=12" and "I=1", or
"L=0", "M=1", and "N=2" when "K=16" and "I=1", or
"L=0", "M=1", and "N=3" when "K=24" and "I=1".

A format other than the above formats may also be employed.

With this embodiment,
the data formatter may generate the packed data in which
"L=0", "M=8", and "N=3" when "K=6" and "I=2", or
"L=1", "M=4", and "N=2" when "K=7" and "I=2", or
"L=0", "M=4", and "N=2" when "K=8" and "I=2", or
"L=1", "M=3", and "N=2" when "K=10" and "I=2", or
"L=0", "M=4", and "N=3" when "K=12" and "I=2", or
"L=0", "M=2", and "N=2" when "K=16" and "I=2", or
"L=0", "M=2", and "N=3" when "K=24" and "I=2".

A format other than the above formats may also be employed.

With this embodiment, "N×8×I=(K+L)×M" may be satisfied.

Note that "N×8×I=(K+L)×M" may not be satisfied in some cases.

With this embodiment, the packet generation circuit may insert setting information for setting M and N in a header of the packet transmitted through the serial bus.

This facilitates format conversion of the packed data performed by the packet receiver side.

This embodiment may include an internal register which stores setting information for setting M and N, and the data formatter may insert the dummy data based on the setting information.

This simplifies insertion of the dummy data. The data formatter may determine the dummy data insertion position or the like based on the count value of a bit counter and the count value of a byte counter.

One embodiment of the invention provides an electronic instrument comprising:

any one of the above data transfer control devices; and
one or more devices connected with the data transfer control device through the interface bus.

One embodiment of the invention provides a data transfer control device which controls data transfer, the data transfer control device comprising:

an interface circuit which performs interface processing between the data transfer control device and a host device connected with the data transfer control device through a system bus; and a link controller which analyzes a packet received through a serial bus and outputs data of which one data unit is K bits (K is an integer of two or more) to the interface circuit, (N×I)-byte (N and I are integers of one or more) packed data, which contains M (M is an integer of one or more) pieces of (K+L)-bit data obtained by adding L bits (L is an integer of zero or more) of dummy data to the K-bit data and in which L and M are variably set corresponding to K, being inserted in a data field of the packet received through the serial bus; and the link controller including a data formatter which extracts the K-bit data from the packed data and outputs the extracted K-bit data to the interface circuit.

According to one embodiment of the invention, the (N×I)-byte packed data, which contains M pieces of (K+L)-bit data obtained by adding L bits of dummy data to the K-bit data and in which L and M are variably set corresponding to K, is inserted in the data field of the packet received through the serial bus. The data formatter extracts the K-bit data from the packed data inserted in the data field of the packet, and outputs the extracted K-bit data to the interface circuit. The amount of data transferred through the serial bus can be reduced by variably setting L of the packed data corresponding to K. An increase in the circuit scale can be prevented by variably setting M of the packed data corresponding to K. Therefore, the invention can realize an efficient serial transfer of data in various formats while preventing an increase in the circuit scale.

With this embodiment, the packed data inserted to the packet may be data in which
"L=0", "M=4", and "N=3" when "K=6" and "I=1", or
"L=1", "M=2", and "N=2" when "K=7" and "I=1", or
"L=0", "M=2", and "N=2" when "K=8" and "I=1", or
"L=2", "M=2", and "N=3" when "K=10" and "I=1", or
"L=0", "M=2", and "N=3" when "K=12" and "I=1", or
"L=0", "M=1", and "N=2" when "K=16" and "I=1", or
"L=0", "M=1", and "N=3" when "K=24" and "I=1".

A format other than the above formats may also be employed.

With this embodiment, the packed data inserted to the packet may be data in which
"L=0", "M=8", and "N=3" when "K=6" and "I=2", or
"L=1", "M=4", and "N=2" when "K=7" and "I=2", or "L=0", "M=4", and "N=2" when "K=8" and "I=2", or
"L=1", "M=3", and "N=2" when "K=10" and "I=2", or
"L=0", "M=4", and "N=3" when "K=12" and "I=2", or
"L=0", "M=2", and "N=2" when "K=16" and "I=2", or
"L=0", "M=2", and "N=3" when "K=24" and "I=2".

A format other than the above formats may also be employed.

With this embodiment, "N×8×I=(K+L)×M" may be satisfied. Note that "N×8×I=(K+L)×M" may not be satisfied in some cases.

With this embodiment,
setting information for setting M and N may be inserted in a header of the packet received through the serial bus;
the link controller may include a packet analysis circuit which analyzes the header of the received packet and may extract the setting information from the header of the packet; and
the data formatter may extract the K-bit data from the packed data based on the setting information.

This facilitates extraction of the K-bit data from the packed data.

With this embodiment,
setting information for setting M and N may be inserted in a header of the packet received through the serial bus;
the link controller may include a packet analysis circuit which analyzes the header of the received packet and may extract the setting information from the header of the packet; and
the data formatter may delete dummy data based on the setting information.

This simplifies deletion of the dummy data. The data formatter may determine the dummy data deletion position or the like based on the count value of a bit counter and the count value of a byte counter.

One embodiment of the invention provides an electronic instrument comprising:
any one of the above data transfer control devices; and
the host device connected with the data transfer control device through the system bus.

Note that the embodiments described hereunder do not in any way limit the scope of the invention defined by the claims laid out herein. Note also that not all of the elements of these embodiments should be taken as essential requirements to the means of the present invention.

1. System Configuration

FIG. 1 shows a data transfer control device (data transfer control circuit) according to one embodiment of the invention and a system configuration example of the data transfer control device. In one embodiment of the invention, a bridge function between a system bus and an interface bus is realized by using host-side and target-side data transfer control devices 10 and 30 shown in FIG. 1.

The configuration of the data transfer control devices 10 and 30 is not limited to the configuration shown in FIG. 1. Some of the circuit blocks shown in FIG. 1 may be omitted, or the configuration of the connection between the circuit blocks may be changed, or a circuit block differing from the circuit blocks shown in FIG. 1 may be additionally provided. For example, a transceiver 20 may be omitted from the host-side data transfer control device 10, or a transceiver 40 may be omitted from the target-side data transfer control device 30. The data transfer control device 30 and a display driver 6 or a camera 8 (imaging device or camera device) may be formed by two chips (semiconductor chips), or may be formed by one chip. Likewise, a host device 5 (system device) and the data transfer control device 10 may be formed by one chip.

The host (TX) side data transfer control device 10 and the target (RX) side data transfer control device 30 transfer packets through a serial bus using differential signals. In more detail, the data transfer control devices 10 and 30 transmit and receive packets by current-driving or voltage-driving differential signal lines of the serial bus.

The host-side data transfer control device 10 includes an interface circuit 92 which performs interface processing between the data transfer control device 10 and the host device 5 (e.g. CPU, baseband engine, or display controller). The interface circuit 92 is connected with the host device 5 through a system bus (host bus). The system bus may be used as an RGB interface bus, a micro processor unit (MPU) interface bus, a serial interface bus, or a camera interface bus. When using the system bus as an RGB interface bus, the system bus may include signal lines for a horizontal synchronization signal, vertical synchronization signal, clock signal, data signal, and the like. When using the system bus as an MPU interface bus, the system bus may include signal lines for a data signal, read signal, write signal, address 0 signal (command/parameter identification signal), chip select signal, and the like. When using the system bus as a serial interface bus, the system bus may include signal lines for a serial interface chip select signal, read/write signal, address 0 signal, data signal, clock signal, and the like. When using the system bus as a camera interface bus, the system bus may include signal lines for a camera interface horizontal synchronization signal, vertical synchronization signal, clock signal, data signal, and the like.

The host-side data transfer control device 10 includes a link controller 90 (link layer circuit) which performs link layer processing. The link controller 90 generates a packet (e.g. request packet or stream packet) transferred to the target-side data transfer control device 30 through the serial bus (LVDS), and transmits the generated packet. In more detail, the link controller 90 initiates a transmission transaction and directs the transceiver 20 to transmit the generated packet.

The host-side data transfer control device 10 includes the transceiver 20 (PHY) which performs physical layer processing or the like. The transceiver 20 transmits a packet indicated by the link controller 90 to the target-side data transfer control device 30 through the serial bus. The transceiver 20 also receives a packet from the target-side data transfer control device 30. In this case, the link controller 90 analyzes the received packet and performs link layer (transaction layer) processing.

The target-side data transfer control device 30 includes the transceiver 40 (PHY) which performs physical layer processing or the like. The transceiver 40 receives a packet from the host-side data transfer control device 10 through the serial bus. The transceiver 40 also transmits a packet to the host-side data transfer control device 10. In this case, a link controller 100 generates a packet transmitted to the host-side data transfer control device 10, and directs the transceiver 40 to transmit the generated packet.

The target-side data transfer control device 30 includes the link controller 100 (link layer circuit). The link controller 100 performs link layer (transaction layer) processing including receiving a packet from the host-side data transfer control device 10 and analyzing the received packet.

The target-side data transfer control device 30 includes an interface circuit 110 which performs interface processing between the data transfer control device 30 and the display driver 6 which drives a display panel 7 (e.g. LCD) or the camera 8 (one or more devices in a broad sense). The interface circuit 110 generates various interface signals and outputs the generated interface signals to the display driver 6 or the like through the interface bus. The interface circuit 110 also receives various interface signals from the camera 8 through the interface bus. The interface circuit 110 may include an RGB interface circuit, an MPU interface circuit, a serial interface circuit, or a camera interface circuit (first to Nth interface circuits in a broad sense).

When the host (host device 5) side system bus is used as an RGB interface bus, the target (display driver 6) side interface bus is also used as an RGB interface bus. The interface circuit 110 (RGB interface circuit) generates RGB interface signals and outputs the generated RGB interface signals to the display driver 6 (device in a broad sense). When the host-side system bus is used as an MPU interface bus, the target-side interface bus is also used as an MPU interface bus. The interface circuit 110 (MPU interface circuit) generates MPU interface signals and outputs the generated MPU interface signals to the display driver 6. When the host-side system bus is used as a camera interface bus, the target-side interface bus is also used as a camera interface bus. The target-side interface circuit 110 (camera interface circuit) receives interface signals from the camera 8. The host-side interface circuit 92 (camera interface circuit) generates camera interface signals and outputs the generated camera interface signals to the host device 5. The system bus and the interface bus may differ in interface type.

In one embodiment of the invention, a bridge function between the host-side system bus and the target-side interface bus is realized by providing the above-described interface circuits 92 and 110.

Specifically, when the system bus is used as an RGB interface bus, RGB interface signals output from the host device 5 are transmitted to the target by packet transfer through the serial bus using differential signals. The target-side interface circuit 110 outputs RGB interface signals corresponding to the RGB interface signals from the host to the display driver 6. When the system bus is used as an MPU interface bus, MPU interface signals output from the host device 5 are transmitted to the target by packet transfer through the serial bus using differential signals. The target-side interface circuit 110 outputs MPU interface signals corresponding to the MPU interface signals from the host to the display driver 6.

When the system bus is used as a camera interface bus, the target transmits camera interface signals (data signal, vertical synchronization signal, and horizontal synchronization signal) output from the camera 8 to the host by packet transfer through the serial bus using differential signals. The host-side interface circuit 92 outputs camera interface signals corresponding to the camera interface signals from the target to the host device 5.

Figure 2:
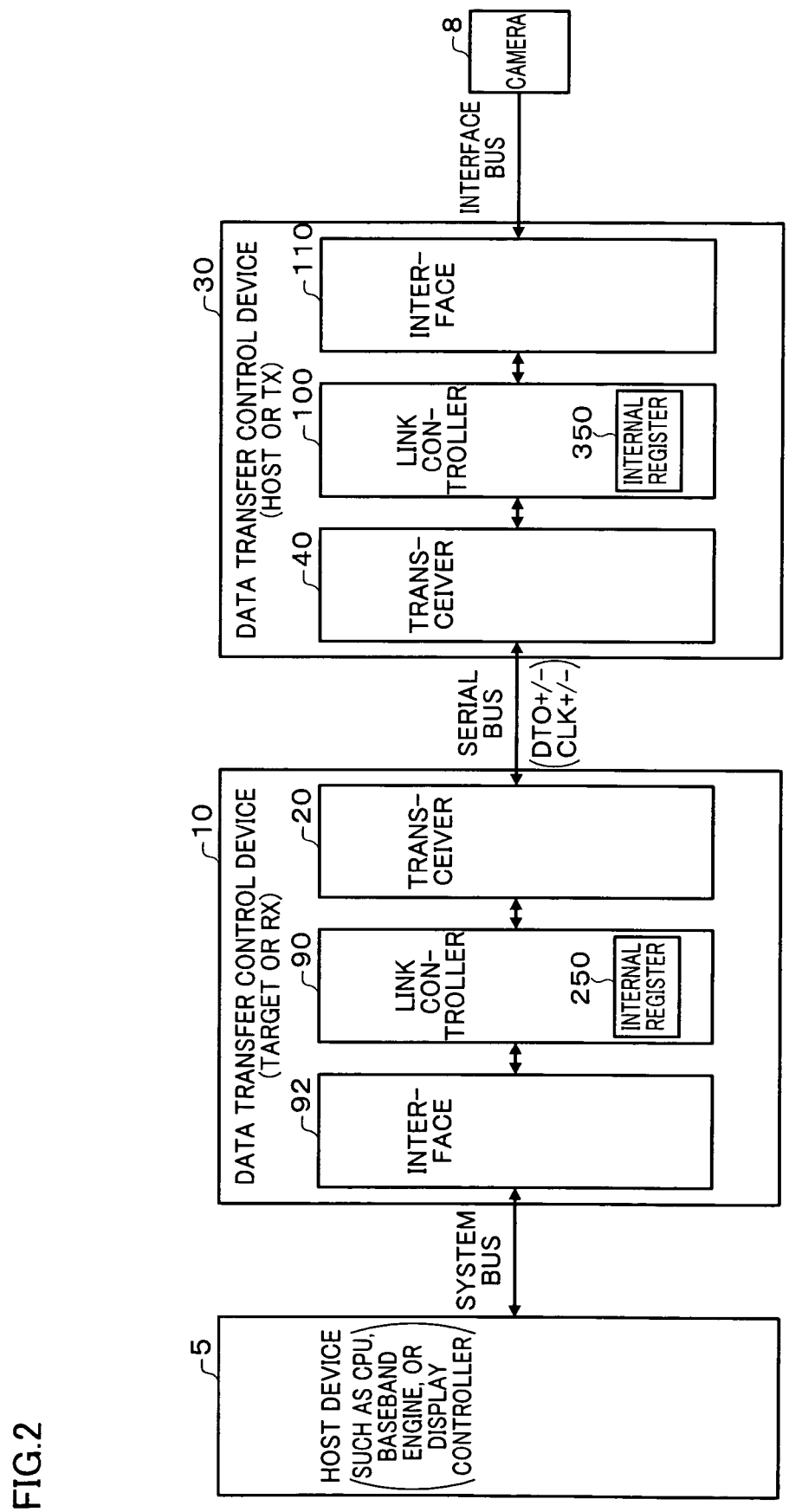
FIG. 2 shows a data transfer control device according to one embodiment of the invention and a system configuration example of the data transfer control device.

In FIG. 1, the data transfer control device 10 connected with the host device 5 functions as the host (TX), and the data transfer control device 30 connected with the camera 8 functions as the target (RX). However, one embodiment of the invention is not limited thereto. As shown in FIG. 2, the data transfer control device 30 connected with the camera 8 may function as the host (TX), and the data transfer control device 10 connected with the host device 5 may function as the target (RX), for example.

In one embodiment of the invention, the host-side data transfer control device includes a clock signal generation circuit (PLL circuit), and outputs the generated clock signal to the target-side data transfer control device. In FIG. 1, the host-side data transfer control device 10 outputs differential clock signals CLK+/− generated by the clock signal generation circuit to the target-side data transfer control device 30. The target-side data transfer control device 30 generates differential strobe signals STB+/− based on the clock signals CLK+/−. The target-side data transfer control device 30 outputs differential data signals DTI+/− (camera data) to the host-side data transfer control device 10 in synchronization with the edge (rising edge or falling edge) of the strobe signals STB+/−.

In FIG. 2, the host-side data transfer control device 30 generates the differential clock signals CLK+/− by the clock signal generation circuit. The host-side data transfer control device 30 outputs differential data signals DTO+/− (camera data) to the target-side data transfer control device 10 in synchronization with the edge of the clock signals CLK+/−.

Figure 13:
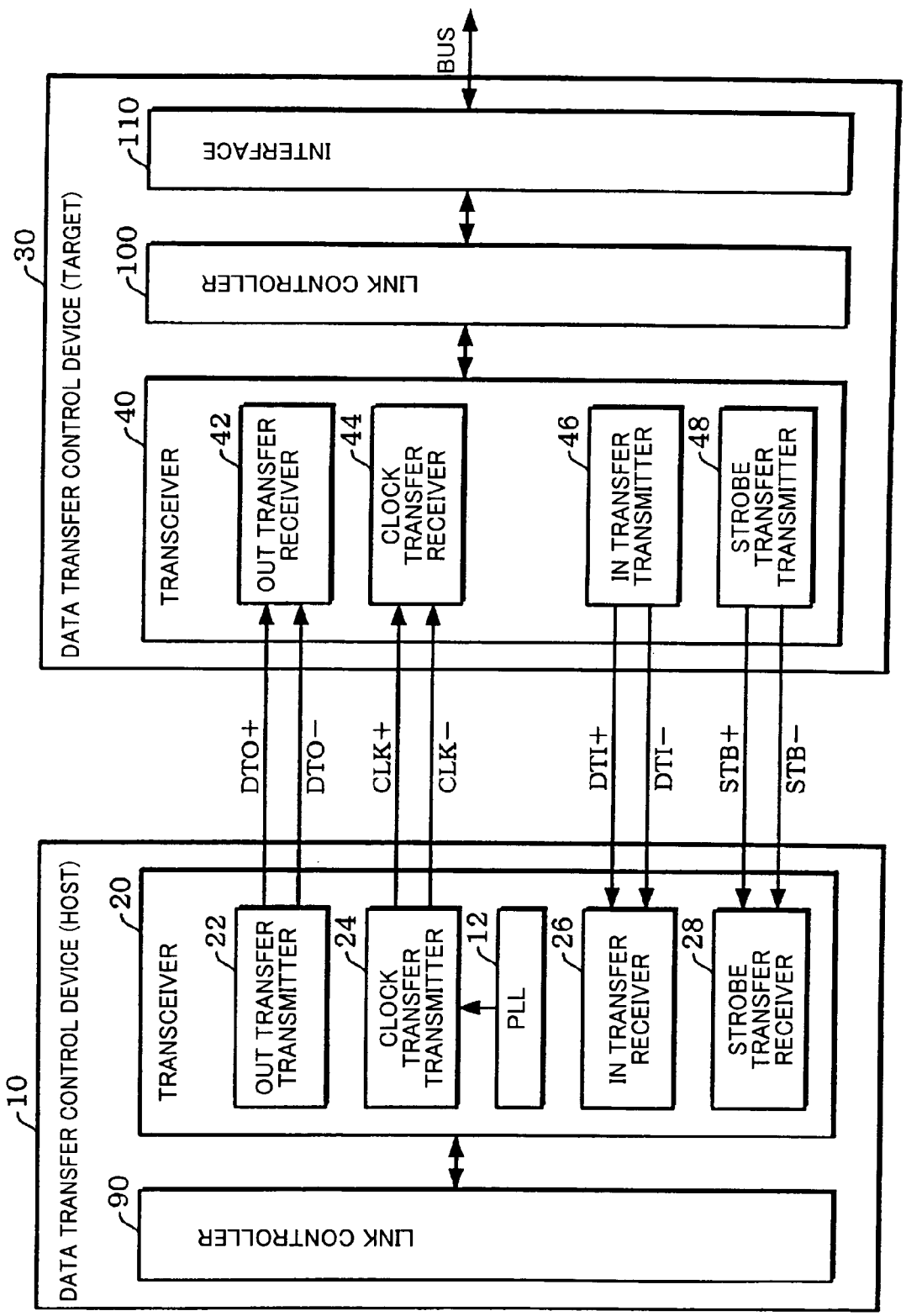
FIG. 13 is illustrative of serial transfer according to one embodiment of the invention.

The serial transfer method using the differential signals DTO+/−, CLK+/−, DTI+/−, and STB+/− is described later in detail with reference to FIG. 13.

2. Camera Data Format Conversion

Camera data output from a camera such as a CCD or CMOS is in various formats such as YUV422, YUV420, RGB888, RGB565, RGB444, RAW6, RAW7, RAW8, RAW10, RAW12, and JPEG8. These formats differ in the number of bits of one data unit of input data, such as 6, 7, 8, 10, 12, 16, and 24 bits (K bits in a broad sense).

On the other hand, a packet transferred through the serial bus is made up of data in byte units or word units (1-byte units in a broad sense). Therefore, in order to packetize the camera data and serially transfer the packetized data, it is necessary to convert the 6-bit, 7-bit, 8-bit, 10-bit, 12-bit, 16-bit, or 24-bit camera data into data in byte units or word units (I-byte units).

FIGS. 3A and 3B and FIGS. 4A and 4B show methods of first and second comparative examples which realize such a format conversion. FIGS. 3A to 4B show examples in which the format conversion target data (camera data) is 10 bits (RAW10). FIGS. 3A and 3B show examples when converting data in 10-bit units into data in byte units, and FIGS. 4A and 4B show examples when converting data in 10-bit units into data in 2-byte units.

In FIGS. 3A to 4B, (101) indicates the first bit of the first data (10-bit data), and (102) indicates the second bit of the first data. Likewise, (201) indicates the first bit of the second data, and (202) indicates the second bit of the second data. Therefore, (101) to (110) indicate the first to tenth bits of the first data, and (201) to (210) indicate the first to tenth bits of the second data. The same definition also applies to (301) to (310), (401) to (410), etc.

As shown in FIGS. 3A and 4A, the first comparative example is an example of unpacked format conversion in which redundant data is inserted. In FIG. 3A, (101) to (108) are set in the first byte data, and (109), (110), and 6-bit redundant data (x) are set in the second byte data. (201) to (208) are set in the third byte data, and (209), (210), and 6-bit redundant data are set in the fourth byte data.

In the first comparative example, 6-bit redundant data must be transferred each time two pieces of byte data are transferred. Therefore, 225 Kbytes (=640×480×6/8/1024) of redundant data must be transferred each time VGA screen data is transferred. Therefore, the amount of data (traffic volume) transferred through the serial bus is increased, whereby the data transfer efficiency is decreased.

As shown in FIGS. 3B and 4B, the second comparative example is an example of packed format conversion in which redundant data is not inserted. The second comparative example can reduce the amount of data transferred through the serial bus in comparison with the first comparative example, since redundant data is not inserted. However, the second comparative example gives rise to a problem such as an increase in the circuit scale of the data transfer control device or complication of processing due to an increase in the scale of a data formatter (decoder circuit) and a counter. In particular, an increase in the scale of the data transfer control device or complication of processing becomes more acute when supporting all of the above-mentioned formats.

3. Configuration Example of Data Transfer Control Device

Figure 5:
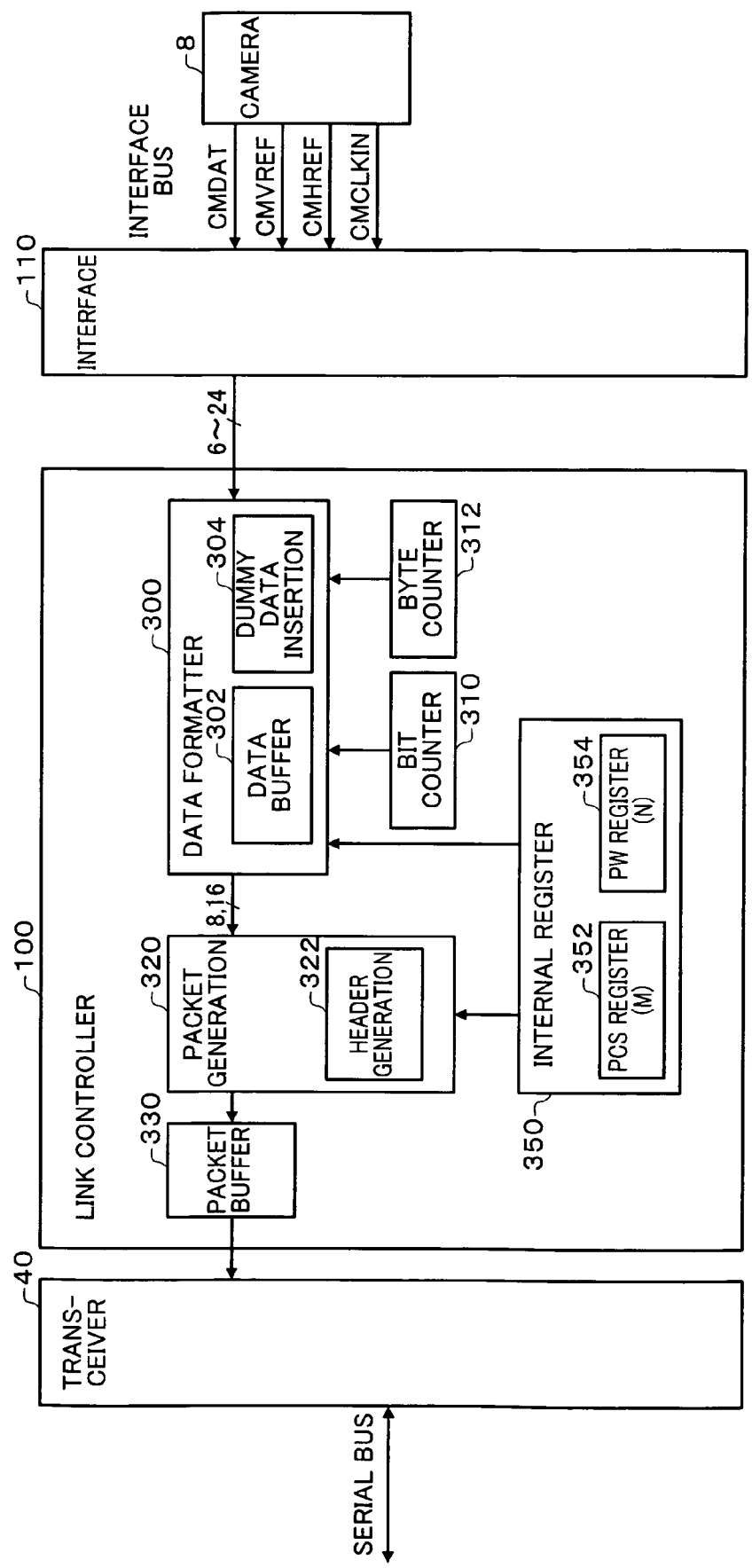
FIG. 5 is a configuration example of the data transfer control device according to one embodiment of the invention.
Figure 6:
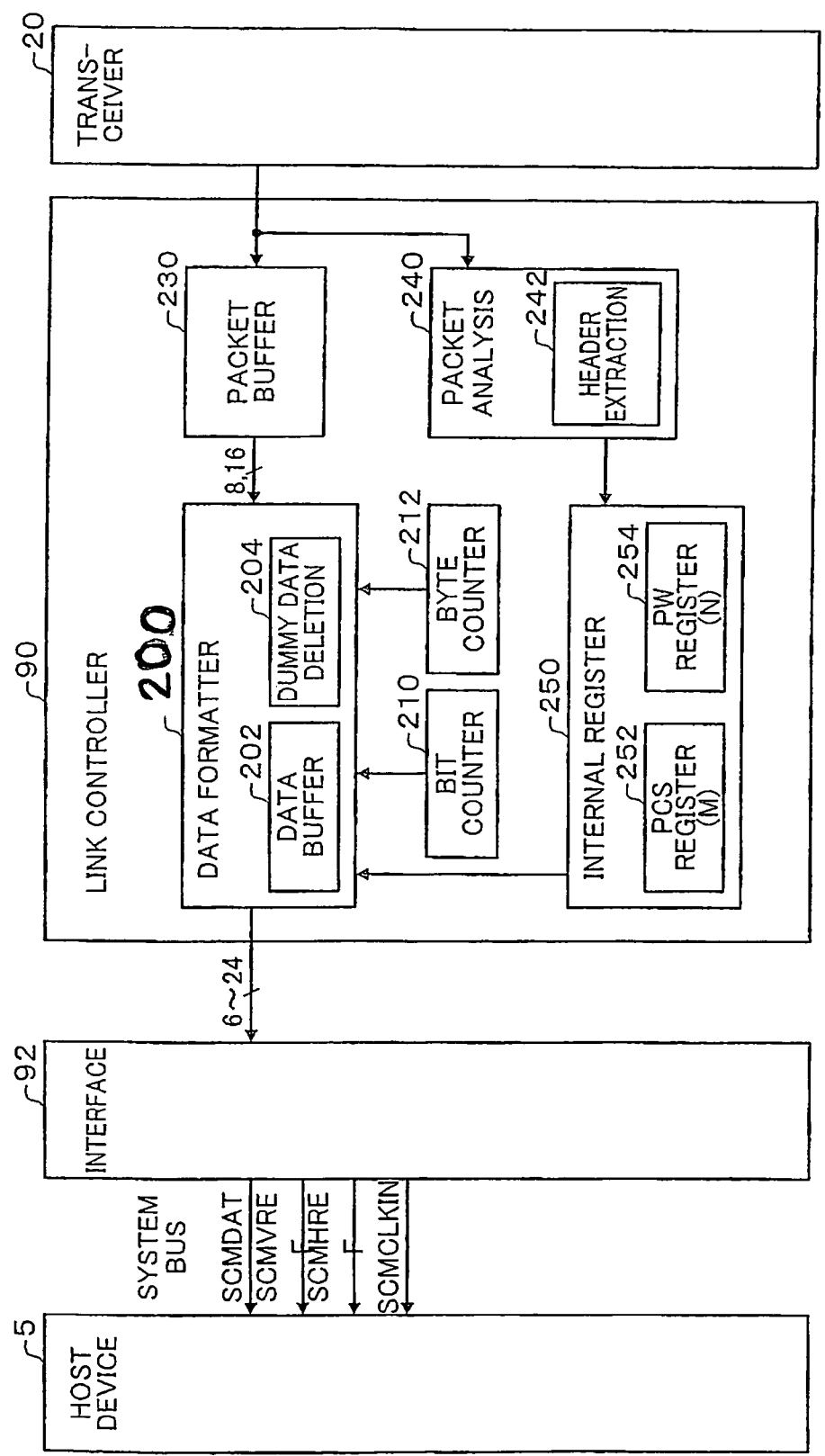
FIG. 6 is a configuration example of the data transfer control device according to one embodiment of the invention.

FIGS. 5 and 6 show configuration examples of the data transfer control device according to one embodiment of the invention which can solve the above-described problems. Note that some of the circuit blocks shown in FIGS. 5 and 6 may be omitted, or the configuration of the connection between the circuit blocks may be changed, or a circuit block differing from the circuit blocks shown in FIGS. 5 and 6 may be additionally provided.

FIG. 5 shows a configuration example of the target-side (host-side in FIG. 2) data transfer control device 30. In FIG. 5, the interface circuit 110 performs interface processing between the data transfer control device 30 and the camera 8 (device in a broad sense). Data of which one data unit is K bits is input to the interface circuit 110 through the interface bus. Note that K is an integer of two (or six) or more.

In more detail, camera data CMDAT of which one data unit is 6, 7, 8, 10, 12, 16, or 24 bits (hereinafter appropriately indicated as "6 to 24 bits") is input to the interface circuit 110. Signals CMVREF and CMHREF respectively corresponding to the vertical synchronization signal and the horizontal synchronization signal and a clock signal CMCLKIN for capturing the camera data CMDAT are also input to the interface circuit 110.

Figure 7A:
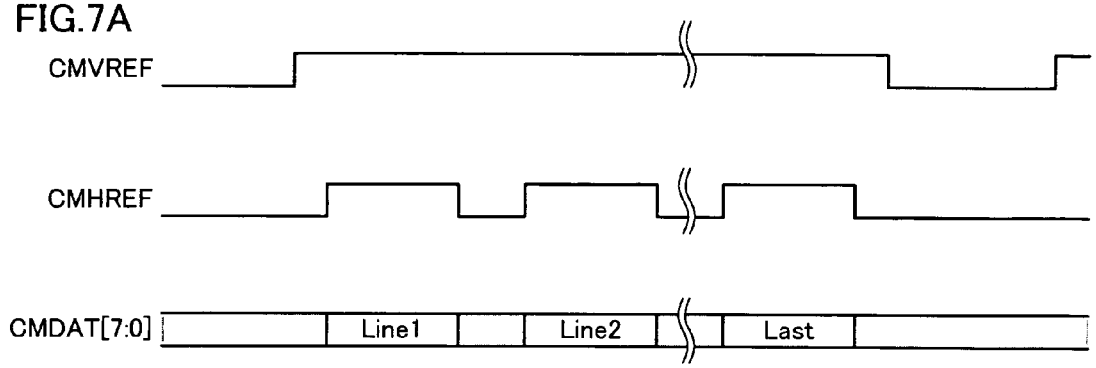
FIGS. 7A to 7D are waveform examples of camera interface signals.
Figure 7B:
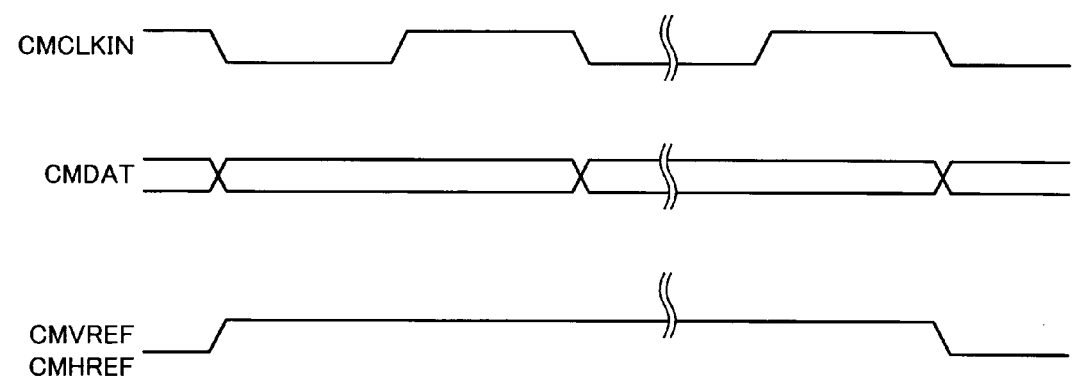
Figure 7C:
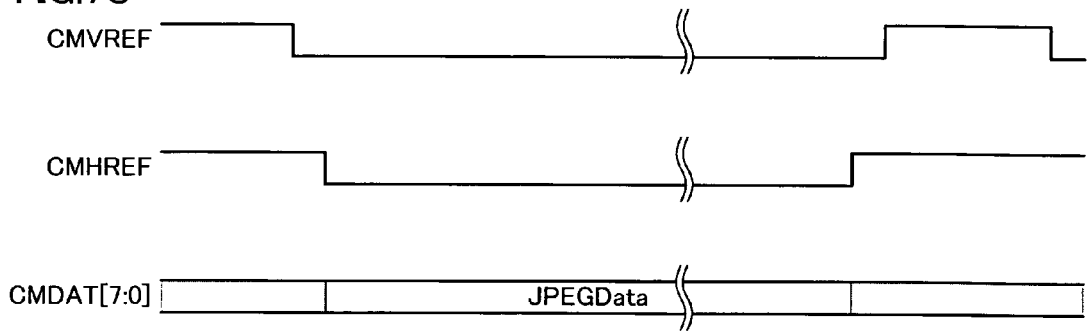
Figure 7D:
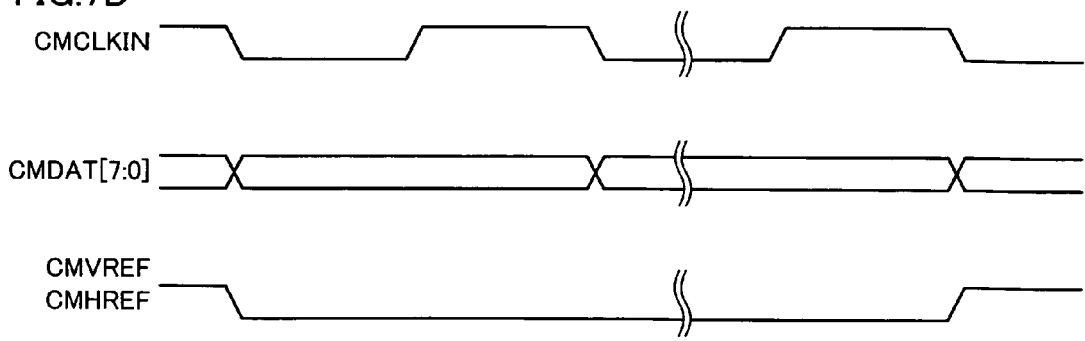

FIGS. 7A and 7B show signal waveform examples of the camera data CMDAT and the signals CMVREF, CMHREF, and CMCLKIN when the camera data is 8-bit data in a YUV format. As shown in FIG. 7A, the camera data CMDAT of one line is input to the interface circuit 110 each time the signal CMHREF becomes active after the signal CMVREF has become active (high level). As shown in FIG. 7B, the camera data CMDAT may be sampled at the rising edge of the clock signal CMCLKIN, for example. The interface circuit 110 outputs the sampled and captured data (camera data) to the link controller 100. FIGS. 7C and 7D show signal waveform examples when the camera data is in a JPEG format.

The link controller 100 includes a data formatter 300, a bit counter 310, a byte counter 312, a packet generation circuit 320, a packet buffer 330, and an internal register 350. The link controller 100 may have a configuration in which some of these blocks are omitted.

The data formatter 300 converts the format of data. For example, the data formatter 300 receives K-bit (6 to 24 bits) data sequentially input from the interface circuit 110, and converts the format of the received data to generate packed data. The data formatter 300 outputs the generated packed data to the packet generation circuit 320 in units of eight bits or sixteen bits (I byte(s) in a broad sense), for example.

In more detail, the data formatter 300 generates (N×I)-byte packed data containing M pieces of (K+L)-bit data obtained by adding L bits of dummy data to the K-bit data (data in K-bit units). Note that L is an integer of zero or more, M is an integer of one or more, and N is an integer of one or more. I is an integer of one or more.

In one embodiment of the invention, the data formatter 300 generates the packed data in which L and M are variably set corresponding to K (L and M are changed corresponding to K). The data formatter 300 inserts dummy data at a bit position determined based on setting information of PCS and PW (M and N) stored in the internal register 350.

FIGS. 8 and 9 show examples of the packed data generated by the data formatter 300. FIG. 8 shows an example of outputting the generated packed data in units of one byte (eight bits), and FIG. 9 shows an example of outputting the generated packed data in units of two bytes (sixteen bits).

In FIGS. 8 and 9, DATA indicates data (camera data) input in units of K bits. PW indicates a pack width (size of packed data). The pack width PW is expressed as "N×I" bytes. The pack width PW is N bytes in FIG. 8, and is "N×2" bytes (N words) in FIG. 9. PCS indicates a packed data count (number of pieces of K-bit data in the packed data), and is expressed as "PCS=M". The number of bits (number of pieces) of dummy data (redundant data) in FIGS. 8 and 9 is expressed as L.

In FIG. 8, when the number of bits K of input data (camera data) is 6, 7, 8, 10, 12, 16, or 24, packed data indicated by A1, A2, A3, A4, A5, A6, or A7 is respectively generated. In FIG. 9, when the number of bits K of input data is 6, 7, 8, 10, 12, 16, or 24, packed data indicated by B1, B2, B3, B4, B5, B6, or B7 is respectively generated. In FIGS. 8 and 9, the number of bits L of dummy data and M which corresponds to the packed data count PCS (or N which corresponds to the pack width PW) are variably changed corresponding to the number of bits K of input data. The details of FIGS. 8 and 9 are described later.

The data formatter 300 includes a data buffer 302 and a dummy data insertion circuit 304. Data in units of K bits (6 to 24 bits) is input to the data buffer 302, and the data buffer 302 outputs the packed data in units of eight bits or sixteen bits. The dummy data insertion circuit 304 inserts dummy data as redundant data. In more detail, the dummy data insertion circuit 304 determines (sets) the bit position (bit position on the data buffer 302) of dummy data based on the setting information of the packed data count PCS and the pack width PW (M and N) stored in the internal register 350, and inserts dummy data (data "0" or "1") at the determined bit position.

The bit counter 310 (pixel counter) counts the number of bits of data. The byte counter 312 counts the number of bytes of data. The data formatter 300 (dummy data insertion circuit 304) performs decode processing based on the bit count value from the bit counter 310, the byte count value from the byte counter 312, and the setting information of the packed data count PCS and the pack width PW (M and N) stored in the internal register 350 to determine the bit position at which dummy data is inserted.

The packet generation circuit 320 generates a packet transmitted through the serial bus. In more detail, the packet generation circuit 320 generates a header of a packet to be transmitted, and assembles a packet by combining the header and data. The generated packet is written into the packet buffer 330 and transferred to the transceiver 40. In this case, a header generation circuit 322 generates the header of the packet.

Figure 10A:
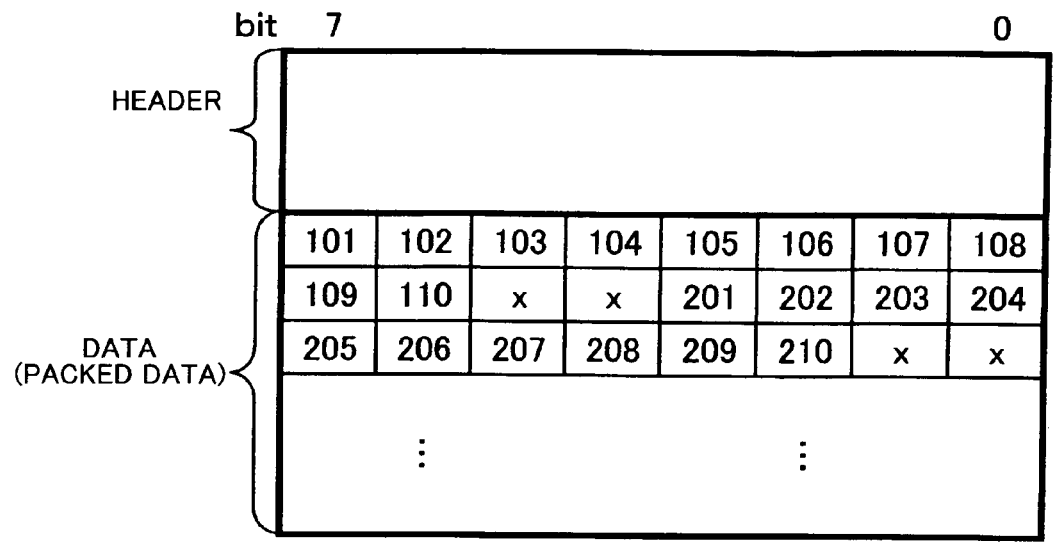
FIGS. 10A and 10B are illustrative of packets used in one embodiment of the invention.

In one embodiment of the invention, as shown in FIG. 10A, the packet generation circuit 320 generates a packet in which the packed data generated by the data formatter 300 is inserted (set) in a data field as a packet transmitted through the serial bus. FIG. 10A shows an example in which the number of bits K of input data is ten (K=10) and the packed data indicated by A4 in FIG. 8 is inserted in the data field.

Note that at least one piece of packed data may be inserted in the data field of the packet, or two or more pieces of packed data may be inserted in the data field of the packet. FIG. 10A shows an example in which the data width of the packet is one byte. The data width of the packet may be two bytes or more (I bytes). When setting the data width of the packet at one byte, the data formatter 300 may output the packed data to the packet generation circuit 320 in units of one byte (eight bits). In this case, the packed data indicated by A1 to A7 in FIG. 8 is used. When setting the data width of the packet at two bytes, the data formatter 300 may output the packed data to the packet generation circuit 320 in units of two bytes (sixteen bits). In this case, the packed data indicated by B1 to B7 in FIG. 9 is used.

Figure 10B:
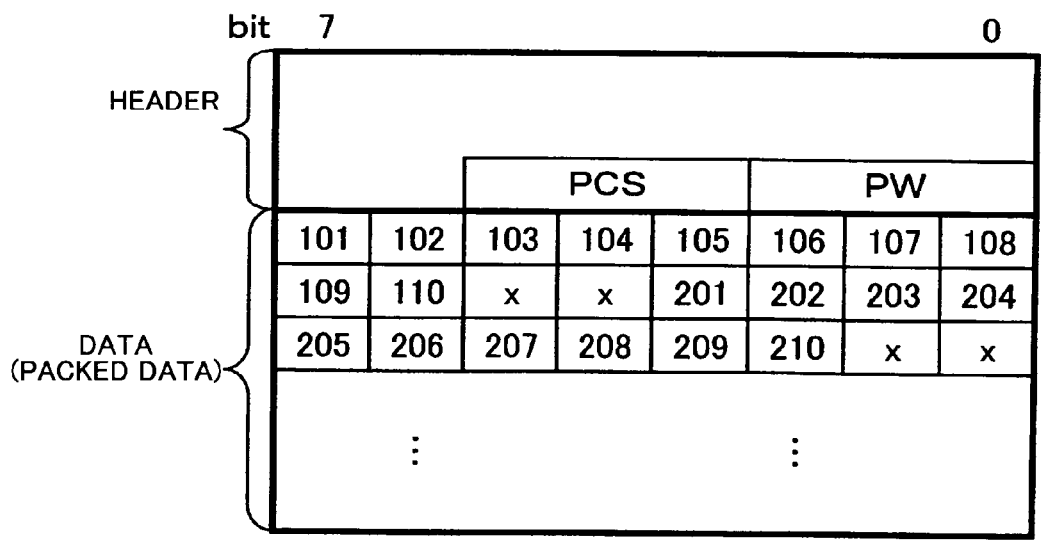

As shown in FIG. 10B, the packet generation circuit 320 may insert the setting information for setting the packed data count PCS and the pack width PW (M and N) in the header of the packet. In more detail, a field for the packed data count PCS (PCS field) and a field for the pack width PW (PW field) are provided in the header of the packet. The setting information of the packed data count PCS and the setting information of the pack width PW are respectively inserted in the PCS field and the PW field. In the example indicated by A1 in FIG. 8, the setting information "PCS=4" and the setting information "PW=24" are respectively inserted in the PCS field and the PW field. In the example indicated by A2, the setting information "PCS=2" and the setting information "PW=16" are respectively inserted in the PCS field and the PW field.

The setting information inserted in the header of the packet need not be the value of the packed data count PCS or the pack width PW, and may be information which allows at least M and N to be set (specified). For example, the value of N (or "N×I") may be used as the setting information instead of the value of the pack width PW. Or, L may be used as the setting information instead of N, and N may be specified by M and L.

The packet buffer 330 is a transmission packet buffer into which a packet transmitted through the serial bus is written. Specifically, a packet transmitted through the serial bus is generated by the packet generation circuit 320, written into the packet buffer 330, and transferred to the transceiver 40. The packet buffer 330 may be formed by a first-in first-out (FIFO) memory or a RAM, for example. The packet buffer 330 may have a ring buffer structure. A reception packet buffer may be further provided in the link controller 100.

The internal register 350 includes various control registers and status registers. The internal register 350 stores the setting information for setting the packed data count PCS and the pack width PW (M and N). In more detail, the internal register 350 includes a PCS register 352 and a PW register 354, and the setting information of the packed data count PCS and the setting information of the pack width PW are respectively stored in the PCS register 352 and the PW register 354. The data formatter 300 determines the dummy data insertion bit position based on the packed data count PCS and the pack width PW. The packet generation circuit 320 inserts the packed data count PCS and the pack width PW in the PCS field and the PW field of the packet, respectively. The setting information of the packed data count PCS and the pack width PW (M and N) may be transferred from the partner device (host device) through the serial bus, and written into the internal register 350.

FIG. 6 shows a configuration example of the host-side (target-side in FIG. 2) data transfer control device 10. As shown in FIG. 6, the link controller 90 included in the data transfer control device 10 includes a data formatter 200, a bit counter 210, a byte counter 212, a packet buffer 230, a packet analysis circuit 240, and an internal register 250. The link controller 90 may have a configuration in which some of these blocks are omitted.

The packet buffer 230 is a reception packet buffer into which a packet received through the serial bus is written. Specifically, a packet received by the transceiver 20 through the serial bus is written into the packet buffer 230. The packed data (see FIGS. 10A and 10B) set in the data field of the written packet is output to the data formatter 200. In this case, the packed data is output to the data formatter 200 in units of eight bits or sixteen bits (I byte(s)), for example.

The packet buffer 230 may be formed by a FIFO memory or a RAM, for example. The packet buffer 230 may have a ring buffer structure. The packet buffer 230 may have a double buffer configuration, or a transmission packet buffer may be further provided in the link controller 90.

The packet analysis circuit 240 analyzes a packet received through the serial bus. Specifically, the packet analysis circuit 240 separates the received packet into the header and the data and extracts the header. The header is extracted by a header extraction circuit 242.

For example, the packet analysis circuit 240 analyzes a packet type field of the header to determine the type (request packet, response packet, or acknowledge packet) of the received packet. The packet analysis circuit 240 analyzes a synchronization signal code field of the header to determine whether or not the received packet includes a synchronization signal code which directs the interface circuit 92 to generate the synchronization signal (vertical synchronization signal or horizontal synchronization signal).

In FIG. 5, when the camera 8 has output the vertical synchronization signal CMVREF, the packet generation circuit 320 generates a packet including the synchronization signal code which directs generation of the vertical synchronization signal, for example. When the camera 8 has output the horizontal synchronization signal CMHREF, the packet generation circuit 320 generates a packet including the synchronization signal code which directs generation of the horizontal synchronization signal. The generated packet is transferred through the serial bus. The packet analysis circuit 240 analyzes the transferred packet. When the packet analysis circuit 240 has detected the vertical synchronization signal code, the packet analysis circuit 240 directs the interface circuit 92 to generate and output a vertical synchronization signal SCMVREF. When the packet analysis circuit 240 has detected the horizontal synchronization signal code, the packet analysis circuit 240 directs the interface circuit 92 to generate and output a horizontal synchronization signal SCMHREF. A bus bridge function between the interface bus and the system bus is realized in this manner.

The packet analysis circuit 240 analyzes the header of the received packet, and extracts the setting information of the packed data count PCS and the pack width PW (M and N). In more detail, the packet analysis circuit 240 extracts the information of the packed data count PCS and the pack width PW when the packed data count PCS and the pack width PW are respectively set in the PCS field and the PW field as shown in FIG. 10B.

The internal register 250 includes various control registers and status registers. The internal register 250 stores the setting information of the packed data count PCS and the pack width PW (M and N) extracted by the packet analysis circuit 240. In more detail, a PCS register 252 and a PW register 254 included in the internal register 250 respectively store the information of the packed data count PCS and the information of the pack width PW.

As shown in FIGS. 10A and 10B, the packed data is inserted in the data field of the packet received through the serial bus. The packed data is (N×I)-byte data containing M pieces of (K+L)-bit data obtained by adding L bits of dummy data to the K-bit data. The packed data is data in which L and M (or N) are variably set corresponding to K.

The data formatter 200 (link controller 90) extracts the K-bit (6 to 24 bits) data (camera data) from the packed data, and outputs the extracted K-bit data to the interface circuit 92. The data formatter 200 deletes dummy data from the bit position determined based on the setting information of the packed data count PCS and the pack width PW (M and N) stored in the internal register 250.

For example, when the packed data indicated by A1 in FIG. 8 is inserted in the data field, the data formatter 200 extracts 6-bit (K=6) data "11" to "16", "21" to "26", "31" to "36", and "41" to "46" from the packed data, and sequentially outputs the extracted data to the interface circuit 92. Likewise, when the packed data indicated by A2, A3, A4, A5, A6, or A7 in FIG. 8 is inserted in the data field, the data formatter 200 extracts 7-bit, 8-bit, 10-bit, 12-bit, 16-bit, or 24-bit (K=7, 8, 10, 12, 16, or 24) data, respectively, and sequentially outputs the extracted data to the interface circuit 92. When the packed data indicated by B1, B2, B3, B4, B5, B6, or B7 in FIG. 9 is inserted in the data field, the data formatter 200 extracts 6-bit, 7-bit, 8-bit, 10-bit, 12-bit, 16-bit, or 24-bit (K=6, 7, 8, 10, 12, 16, or 24) data, respectively, and sequentially outputs the extracted data to the interface circuit 92.

The data formatter 200 includes a data buffer 202 and a dummy data deletion circuit 204. The packed data is input to the data buffer 202 in units of eight bits or sixteen bits, and the data buffer 202 outputs data in units of K bits (6 to 24 bits). The dummy data deletion circuit 204 deletes dummy data as redundant data. In more detail, the dummy data deletion circuit 204 determines (sets) the bit position (bit position on the data buffer 202) of dummy data based on the setting information of the packed data count PCS and the pack width PW (M and N) stored in the internal register 250, and deletes dummy data (data "0" or "1") from the determined bit position.

The bit counter 210 counts the number of bits of data. The byte counter 212 counts the number of bytes of data. The data formatter 200 (dummy data deletion circuit 204) performs decode processing based on the bit count value from the bit counter 210, the byte count value from the byte counter 212, and the setting information of the packed data count PCS and the pack width PW (M and N) stored in the internal register 250 to determine the bit position at which dummy data is deleted.

The interface circuit 92 receives K-bit (6 to 24 bits) data (camera data) from the data formatter 200. The interface circuit 92 outputs the received data to the host device 5 as data SCMDAT. In this case, the interface circuit 92 outputs the vertical synchronization signal SCMVREF, the horizontal synchronization signal SCMHREF, and a clock signal SCMCLKIN having waveforms similar to those shown in FIGS. 7A to 7D to the host device 5. This enables reproduction of the camera data CMDAT, the vertical synchronization signal CMVREF, the horizontal synchronization signal CMHREF, and the like output from the camera 8.

4. Format Conversion Method

The format conversion method according to one embodiment of the invention is described below in detail. In the example indicated by A1 in FIG. 8, the input camera data is in a RAW6 format so that 6-bit (K=6) data "11" to "16", "21" to "26", "31" to "36", and "41" to "46" is input. Note that "11" indicates the first bit of the first data (6-bit data), and "12" indicates the second bit of the first data. "21" indicates the first bit of the second data, and "22" indicates the second bit of the second data. "x" indicates dummy data (redundant data).

When the number of bits K is six as indicated by A1 in FIG. 8, the pack width PW is set at "24" and the packed data count PCS is set at "4". The number of bits L of dummy data is set at "0". Therefore, 24-bit (PW=24) (N=3) packed data containing four (M) (PCS=4) pieces of 6-bit ((K+L)-bit) data is generated.

In the example indicated by A2 in FIG. 8, the camera data is in a RAW7 format so that 7-bit (K=7) data "11" to "17" and "21" to "27" is input. When K is seven (K=7), the pack width PW is set at "16" and the packed data count PCS is set at "2". The number of bits L of dummy data is set at "1". Therefore, 16-bit (PW=16) (N=2) packed data containing two (M) (PCS=2) pieces of 8-bit ((K+L)-bit) data is generated.

In the example indicated by A2 in FIG. 8, dummy data may be inserted when the count value of the byte counter is "1" and the count value of the bit counter is "8" and when the count value of the byte counter is "2" and the count value of the bit counter is In the example indicated by A3 in FIG. 8, the camera data is in a YUV422, YUV420, RAW8, or JPEG8 format so that 8-bit (K=8) data "11" to "18" and "21" to "28" is input. When K is eight (K=8), the pack width PW is set at "16" and the packed data count PCS is set at "2". The number of bits L of dummy data is set at "0". Therefore, 16-bit (PW=16) (N=2) packed data containing two (M) (PCS=2) pieces of 8-bit ((K+L)-bit) data is generated.

In the example indicated by A4 in FIG. 8, dummy data may be inserted when the count value of the byte counter is "2" and the count value of the bit counter is "3" and "4" and when the count value of the byte counter is "3" and the count value of the bit counter is "7" and "8".

In the example indicated by A4 in FIG. 8, the camera data is in a RAW10 format so that 10-bit (K=10) data "101" to "110" and "201" to "210" is input. When K is ten (K=10), the pack width PW is set at "24" and the packed data count PCS is set at "2". The number of bits L of dummy data is set at "2". Therefore, 24-bit (PW=24) (N=3) packed data containing two (M) (PCS=2) pieces of 12-bit ((K+L)-bit) data is generated. The packed data is generated in the same manner as described above in the examples indicated by A5 to A7 in FIG. 8 and B1 to B7 in FIG. 9.

In the first comparative example shown in FIGS. 3A and 4A, the number of bits of redundant data is large. Therefore, the amount of data transferred through the serial bus is increased. In the second comparative example shown in FIGS. 3B and 4B, redundant data is not used. However, the scale of the data formatter and the counter must be increased in order to support the camera data in all the formats.

The method according to one embodiment of the invention uses redundant data. However, the number of bits of redundant data is sufficiently smaller than that of the first comparative example. Therefore, since the amount of data transferred through the serial bus is not increased to a large extent, the data transfer efficiency can be increased. Moreover, the circuit scale of the data formatter and the counter is not increased to a large extent in comparison with the second comparative example even when supporting the camera data in all the formats shown in FIGS. 8 and 9.

An advantage of the method according to one embodiment of the invention over the first and second comparative examples is described below with reference to FIGS. 11A to 12C. FIGS. 11A to 11C show examples in which the width (bus width) of the packet is eight bits (I=1) and the packed data shown in FIG. 8 is set, and FIGS. 12A to 12C show examples in which the width of the packet is sixteen bits (I=2) and the packed data shown in FIG. 9 is set.

In FIGS. 11A and 12C, N indicates the number of bytes or the number of words of the packed data, and L indicates the number of bits of redundant data (dummy data). K indicates the number of bits of input data, and M indicates the number of pieces of (K+L)-bit data in the packed data.

In order to convert the format, counters (e.g. byte counter and bit counter) counting each of N, M, and K shown in FIGS. 11A to 12C are necessary. The condition for K is the same in the first and second comparative examples and one embodiment of the invention. Therefore, the circuit scale is increased or decreased depending on the counters which count N and M, a circuit which multiplexes and decodes the count value from the counter, and the like. Therefore, it is necessary to reduce "N×M" in order to decrease the circuit scale. The number of combinations of "N/M" corresponds to the number of circuits.

In order to reduce the amount of data transferred through the serial bus, it is necessary to reduce the number of bits L of redundant data.

Therefore, it is desirable to minimize "N×M" and L in order to reduce the amount of data transferred and the circuit scale.

In the first comparative example shown in FIGS. 11A and 12A, M is fixed at "1". Therefore, "N×M" (circuit scale) can be reduced. For example, the sum of "N×M" is 12 points in FIG. 11A and eight points in FIG. 12A.

However, the number of bits L of redundant data (amount of data transferred) is increased in the first comparative example. For example, the sum of L is as large as 13 bits in FIG. 11A and 45 bits in FIG. 12A.

In the second comparative examples shown in FIGS. 11B and 12B, L is fixed at "0". Therefore, L (amount of data transferred) can be reduced. For example, the sum of L is zero bit in FIGS. 11B and 12B.

However, since N and M are large in the second comparative example, "N×M" (circuit scale) is increased. For example, the sum of "N×M" is as large as 100 points in FIG. 11B and 197 points in FIG. 12B.

In the method according to one embodiment of the invention shown in FIGS. 11C and 12C, L and M are variably set corresponding to K. Specifically, L and M are changed to appropriate values corresponding to K.

In more detail, in FIG. 11C in which "I=1", the packed data is generated so that (1) "L=0", "M=4", and "N=3" when "K=6", (2) "L=1", "M=2", and "N=2" when "K=7", (3) "L=0", "M=2", and "N=2" when "K=8", (4) "L=2", "M=2", and "N=3" when "K=10", (5) "L=0", "M=2", and "N=3" when "K=12", (6) "L=0", "M=1", and "N=2" when "K=16", or (7) "L=0", "M=1", and "N=3" when "K=24".

In FIG. 12C in which "I=2", the packed data is generated so that (11) "L=0", "M=8" and "N=3" when "K=6" and "I=2", (12) "L=1", "M=4", and "N=2" when "K=7" and "I=2", (13) "L=0", "M=4", and "N=2" when "K=8" and "I=2", (14) "L=1", "M=3", and "N=2" when "K=10" and "I=2", (15) "L=0", "M=4", and "N=3" when "K=12" and "I=2", (16) "L=0", "M=2", and "N=2" when "K=16" and "I=2", or (17) "L=0", "M=2", and "N=3" when "K=24" and "I=2".

In the method according to one embodiment of the invention, the equation "N×8×I=(K+L)×M" is satisfied. In FIG. 11C in which "I=1", the equation "N×8=(K+L)×M" is satisfied. In FIG. 12C in which "I=2", the equation "N×8×2=(K+L)×M" is satisfied. Only one exception is the case where "K=10" in FIG. 12C ((14)).

The packed data may be generated so that only some of (1) to (7) and (11) to (17) are satisfied instead of satisfying all of (1) to (7) and (11) to (17). Specifically, only some of YUV422, YUV420, RGB888, RGB565, RGB444, RAW6, RAW7, RAW8, RAW10, RAW12, and JPEG8 may be supported.

As is clear from FIGS. 11C and 12C, the method according to one embodiment of the invention can reduce "N×M" (circuit scale) in comparison with the second comparative example. For example, the sum of "N×M" is 37 points in FIG. 11C and 68 points in FIG. 12C. Therefore, the circuit scale can be sufficiently reduced in comparison with the second comparative example in which the sum of "N×M" is 100 points or 197 points.

Moreover, the method according to one embodiment of the invention can reduce L (amount of data transferred) since the number of bits of redundant data is smaller than that of the first comparative example. For example, the sum of L is three bits in FIG. 11C and two bits in FIG. 12C. Therefore, the amount of data transferred can be sufficiently reduced in comparison with the first comparative example in which the sum of L is 13 bits or 45 bits.

As described above, the method according to one embodiment of the invention can minimize "N×M" and L in combination. Therefore, an efficient serial transfer of data in various formats can be realized without increasing the circuit scale to a large extent.

5. Data Transfer Method Using Differential Signals

The serial transfer method according to one embodiment of the invention is described below with reference to FIG. 13. In FIG. 13, DTO+ and DTO− indicate data (OUT data) output from the host (data transfer control device 10) to the target (data transfer control device 30). CLK+ and CLK− indicate clock signals supplied from the host to the target. The host outputs the data DTO+/− in synchronization with the edge (e.g. rising edge; may be falling edge) of the clock signals CLK+/−. Therefore, the target can sample and store the data DTO+/− using the clock signals CLK+/−. In FIG. 13, the target operates based on the clock signals CLK+/− supplied from the host. Specifically, the clock signals CLK+/− serve as a system clock signal of the target. Therefore, a phase locked loop (PLL) circuit 12 (clock signal generation circuit in a broad sense) is provided to the host, and is not provided to the target.

DTI+ and DTI− indicate data (IN data) output from the target to the host. STB+ and STB− indicate strobes (clock signals in a broad sense) supplied from the target to the host. The target generates and outputs the strobes STB+/− based on the clock signals CLK+/− supplied from the host. The host outputs the data DTI+/− in synchronization with the edge (e.g. rising edge; may be falling edge) of the strobes STB+/−. Therefore, the host can sample and store the data signals DTI+/− using the strobes STB+/−.

The data DTO+/−, the clock signals CLK+/−, the data DTI+/−, and the strobes STB+/− are transmitted by causing a transmitter circuit (driver circuit) to current-drive (voltage-drive) the corresponding differential signal lines. In order to realize a higher speed transfer, two or more pairs of DTO+/− differential signal lines and DTI+/− differential signal lines may be provided.

The host-side transceiver 20 includes OUT transfer (data transfer in a broad sense) and clock transfer transmitter circuits 22 and 24, and IN transfer (data transfer in a broad sense) and strobe transfer (clock transfer in a broad sense) receiver circuits 26 and 28. The target-side transceiver 40 includes OUT transfer and clock transfer receiver circuits 42 and 44, and IN transfer and strobe transfer transmitter circuits 46 and 48. Note that some of these circuit blocks may be omitted.

The OUT transfer and clock transfer transmitter circuits 22 and 24 respectively transmit the data DTO+/− and the clock signals CLK+/− by current-driving the DTO+/− differential signal lines and the CLK+/− differential signal lines. The OUT transfer and clock transfer receiver circuits 42 and 44 respectively receive the data DTO+/− and the clock signals CLK+/− by performing a current/voltage conversion based on current which flows through the DTO+/− differential signal lines and the CLK+/− differential signal lines, and performing comparison processing (differential amplification processing) between differential voltage signals (first and second voltage signals) obtained by the current/voltage conversion.

The IN transfer and clock transfer transmitter circuits 46 and 48 respectively transmit the data DTI+/− and the strobes STB+/− by current-driving the DTI+/− differential signal lines and the STB+/− differential signal lines. The IN transfer and strobe transfer receiver circuits 26 and 28 respectively receive the data DTI+/− and the strobes STB+/− by performing a current/voltage conversion based on current which flows through the DTI+/− differential signal lines and the STB+/− differential signal lines, and comparing (differential amplification processing) the differential voltage signals (first and second voltage signals) obtained by the current/voltage conversion.

6. Electronic Instrument

Figure 14:
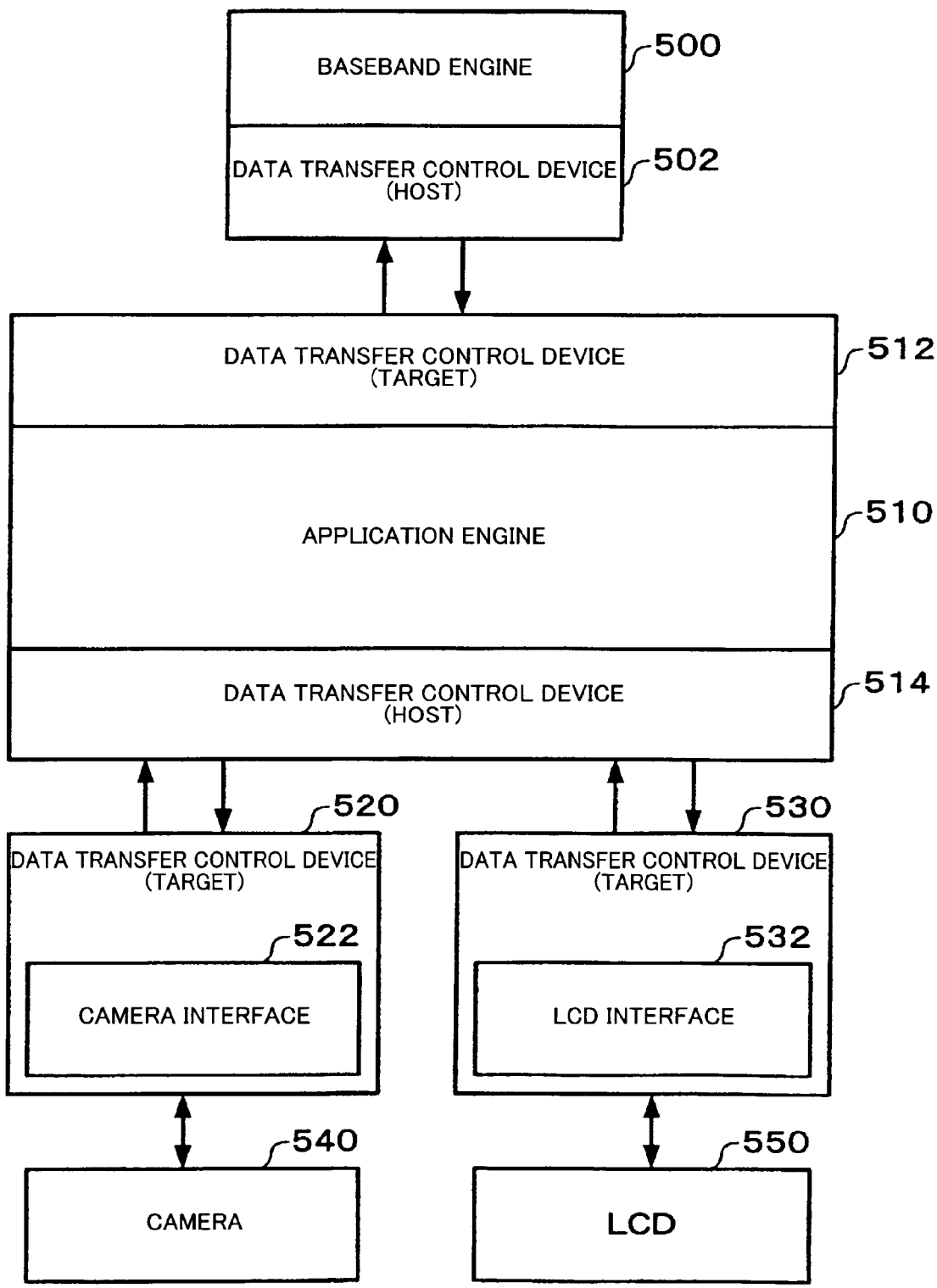
FIG. 14 is a configuration example of an electronic instrument.

FIG. 14 shows a configuration example of an electronic instrument according to one embodiment of the invention. The electronic instrument includes data transfer control devices 502, 512, 514, 520, and 530 described in one embodiment of the invention. The electronic instrument also includes a baseband engine 500 (communication device in a broad sense), an application engine 510 (processor in a broad sense), a camera 540 (imaging device in a broad sense), and an LCD 550 (display device in a broad sense). The link controller 90 may have a configuration in which some of these blocks are omitted. According to this configuration, a portable telephone or the like having a camera function and a liquid crystal display (LCD) display function can be realized. Note that the electronic instrument according to one embodiment of the invention is not limited to a portable telephone, and may be applied to various electronic instruments such as a digital camera, PDA, electronic notebook, electronic dictionary, or portable information terminal.

As shown in FIG. 14, the serial transfer described in one embodiment of the invention is performed between the host-side data transfer control device 502 provided in the baseband engine 500 and the target-side data transfer control device 512 provided in the application engine 510 (graphic engine). The serial transfer described in one embodiment of the invention is also performed between the host-side data transfer control device 514 provided in the application engine 510 and the data transfer control device 520 including a camera interface circuit 522 or the data transfer control device 530 including an LCD interface circuit 532. The baseband engine 500 and the application engine 510 may be implemented by a single hardware device (e.g. CPU).

According to the configuration shown in FIG. 14, EMI noise can be reduced in comparison with a known electronic instrument. Moreover, power consumption of the electronic instrument can be further reduced by realizing a reduction in scale and power consumption of the data transfer control device. In the case where the electronic instrument is a portable telephone, a serial signal line can be used as a signal line passing through the connection section (hinge section) of the portable telephone, whereby mounting can be facilitated.

Although only some embodiments of the present invention have been described in detail above, those skilled in the art will readily appreciate that many modifications are possible in the embodiments without materially departing from the novel teachings and advantages of this invention. Accordingly, all such modifications are intended to be included within scope of this invention. Any term (a camera or display driver, and 8-bit or 16-bit) cited with a different term having broader or the same meaning (a device, and I-byte) at least once in this specification and drawings can be replaced by the different term in any place in this specification and drawings.

The configurations and the operations of the data transfer control device and the electronic instrument are not limited to the configurations and the operations described in one embodiment of the invention. Various modifications and variations may be made. The format conversion method is not limited to the method described with reference to FIGS. 8, 12C, etc. For example, K is not limited to 6, 7, 8, 10, 12, 16, or 24, and I is not limited to 1 or 2. The method according to the invention may also be used to convert the format of data other than camera data.

What is claimed is:

1. A data transfer control device that controls data transfer, the data transfer control device comprising:
    an interface circuit to which data is input through an interface bus, one data unit of the data being K bits (K is an integer of two or more); and
    a link controller that generates a packet transmitted through a serial bus,
    the link controller including:
    a data formatter that generates (N×I)-byte (N and I are integers of one or more) packed data, the (N×I)-byte packed data containing M (M is an integer of one or more) pieces of (K+L)-bit data, the (K+L)-bit data being obtained by adding L bits (L is an integer of zero or more) of dummy data to the K-bit data, the data formatter generating the (N×I)-byte packed data in which L and M are variably set corresponding to K; and
    a packet generation circuit that generates a packet in which the (N×I)-byte packed data is inserted in a data field as the packet is transmitted through the serial bus,
    the data formatter generating the (N×I)-byte packed data in which
    "L=0", "M=4", and "N=3" when "K=6" and "I=1", or
    "L=1", "M=2", and "N=2" when "K=7" and "I=1", or
    "L=0", "M=2", and "N=2" when "K=8" and "I=1", or
    "L=2", "M=2", and "N=3" when "K=10" and "I=1", or
    "L=0", "M=2", and "N=3" when "K=12" and "I=1", or
    "L=0", "M=1", and "N=2" when "K=16" and "I=1", or
    "L=0", "M=1", and "N=3" when "K=24" and "I=1".

2. The data transfer control device as defined in claim 1, the data formatter generating the (N×I)-byte packed data in which
    "L=0", "M=8", and "N=3" when "K=6" and "I=2", or
    "L=1", "M=4", and "N=2" when "K=7" and "I=2", or
    "L=0", "M=4", and "N=2" when "K=8" and "I=2", or
    "L=1", "M=3", and "N=2" when "K=10" and "I=2", or
    "L=0", "M=4", and "N=3" when "K=12" and "I=2", or
    "L=0", "M=2", and "N=2" when "K=16" and "I=2", or
    "L=0", "M=2", and "N=3" when "K=24" and "I=2".

3. The data transfer control device as defined in claim 1, the packet generation circuit inserting setting information for setting M and N in a header of the packet transmitted through the serial bus.

4. The data transfer control device as defined in claim 1, comprising:
    an internal register that stores setting information for setting M and N,
    the data formatter inserting the dummy data based on the setting information.

5. An electronic instrument comprising:
    the data transfer control device as defined in claim 1; and
    one or more devices connected with the data transfer control device through the interface bus.

6. A data transfer control device that controls data transfer, the data transfer control device comprising:

19 an interface circuit to which data is input through an interface bus, one data unit of the data being K bits (K is an integer of two or more); and a link controller that generates a packet transmitted through a serial bus, the link controller including:

a data formatter that generates (N×I)-byte (N and I are integers of one or more) packed data, the (N×I)-byte packed data containing M (M is an integer of one or more) pieces of (K+L)-bit data, the (K+L)-bit data being obtained by adding L bits (L is an integer of zero or more) of dummy data to the K-bit data, the data formatter generating the (N×I)-byte packed data in which L and M are variably set corresponding to K; and a packet generation circuit that generates a packet in which the (N×I) byte packed data is inserted in a data field as the packet is transmitted through the serial bus, the data formatter generating the (N×I)-byte packed data in which "L=0", "M=8", and "N=3" when "K=6" and "I=2", or
"L=1", "M=4", and "N=2" when "K=7" and "I=2", or
"L=0", "M=4", and "N=2" when "K=8" and "I=2", or
"L=1", "M=3", and "N=2" when "K=10" and "I=2", or
"L=0", "M=4", and "N=3" when "K=12" and "I=2", or
"L=0", "M=2", and "N=2" when "K=16" and "I=2", or
"L=0", "M=2", and "N=3" when "K=24" and "I=2".

7. An electronic instrument comprising:
the data transfer control device as defined in claim 6; and
one or more devices connected with the data transfer control device through the interface bus.

8. A data transfer control device that controls data transfer, the data transfer control device comprising:

an interface circuit to which data is input through an interface bus, one data unit of the data being K bits (K is an integer of two or more); and a link controller that generates a packet transmitted through a serial bus, the link controller including:

a data formatter that generates (N×I)-byte (N and I are integers of one or more) packed data, the (N×I)-byte packed data containing M (M is an integer of one or more) pieces of (K+L)-bit data, the (K+L)-bit data being obtained by adding L bits (L is an integer of zero or more) of dummy data to the K-bit data, the data formatter generating the (N×I)-byte packed data in which L and M are variably set corresponding to K; and a packet generation circuit that generates a packet in which the (N×I) byte packed data is inserted in a data field as the packet is transmitted through the serial bus, "N×8×I=(K+L)×M" being satisfied.

9. An electronic instrument comprising:
the data transfer control device as defined in claim 8; and
one or more devices connected with the data transfer control device through the interface bus.

10. A data transfer control device that controls data transfer, the data transfer control device comprising:

an interface circuit that performs interface processing between the data transfer control device and a host device connected with the data transfer control device through a system bus; and a link controller that analyzes a packet received through a serial bus and outputs data to the interface circuit, one data unit of the data being K bits (K is an integer of two or more), (N×I)-byte (N and I are integers of one or more) packed data being inserted in a data field of the packet received through the serial bus, the (N×I)-byte packed data containing M (M is an integer of one or more) pieces of (K+L)-bit data, the (K+L)-bit data being obtained by adding L bits (L is an integer of zero or more) of dummy data to the K-bit data, the (N×I)-byte packed data L and M being variably set corresponding to K, and

20 the link controller including a data formatter that extracts the K-bit data from the (N×I)-byte packed data and outputs the K-bit data to the interface circuit, the (N×I)-byte packed data inserted to the packet being data in which "L=0", "M=4", and "N=3" when "K=6" and "I=1", or
"L=1", "M=2", and "N=2" when "K=7" and "I=1", or
"L=0", "M=2", and "N=2" when "K=8" and "I=1", or
"L=2", "M=2", and "N=3" when "K=10" and "I=1", or
"L=0", "M=2", and "N=3" when "K=12" and "I=1", or
"L=0", "M=1", and "N=2" when "K=16" and "I=1", or
"L=0", "M=1", and "N=3" when "K=24" and "I=1".

11. The data transfer control device as defined in claim 10, the (N×I)-byte packed data inserted to the packet being data in which "L=0", "M=8", and "N=3" when "K=6" and "I=2", or
"L=1", "M=4", and "N=2" when "K=7" and "I=2", or
"L=0", "M=4", and "N=2" when "K=8" and "I=2", or
"L=1", "M=3", and "N=2" when "K=10" and "I=2", or
"L=0", "M=4", and "N=3" when "K=12" and "I=2", or
"L=0", "M=2", and "N=2" when "K=16" and "I=2", or
"L=0", "M=2", and "N=3" when "K=24" and "I=2".

12. The data transfer control device as defined in claim 10,
setting information for setting M and N being inserted in a header of the packet received through the serial bus,
the link controller including a packet analysis circuit that analyzes the header of the received packet and extracts the setting information from the header of the packet, and
the data formatter extracting the K-bit data from the (N×I)-byte packed data based on the setting information.

13. The data transfer control device as defined in claim 10,
setting information for setting M and N being inserted in a header of the packet received through the serial bus;
the link controller including a packet analysis circuit that analyzes the header of the received packet and extracts the setting information from the header of the packet, and
the data formatter deleting dummy data based on the setting information.

14. An electronic instrument comprising:
the data transfer control device as defined in claim 10; and
the host device connected with the data transfer control device through the system bus.

15. A data transfer control device that controls data transfer, the data transfer control device comprising:

an interface circuit that performs interface processing between the data transfer control device and a host device connected with the data transfer control device through a system bus; and a link controller that analyzes a packet received through a serial bus and outputs data to the interface circuit, one data unit of the data being K bits (K is an integer of two or more), (N×I)-byte (N and I are integers of one or more) packed data being inserted in a data field of the packet received through the serial bus, the (N×I)-byte packed data containing M (M is an integer of one or more) pieces of (K+L)-bit data the (K+L)-bit data being obtained by adding L bits (L is an integer of zero or more) of dummy data to the K-bit data, the (N×I)-byte packed data L and M being variably set corresponding to K, and the link controller including a data formatter that extracts the K-bit data from the (N×I)-byte packed data and outputs the K-bit data to the interface circuit, the (N×I)-byte packed data inserted to the packet being data in which "L=0", "M=8", and "N=3" when "K=6" and "I=2", or
"L=1", "M=4", and "N=2" when "K=7" and "I=2", or
"L=0", "M=4", and "N=2" when "K=8" and "I=2", or
"L=1", "M=3", and "N=2" when "K=10" and "I=2", or
"L=0", "M=4", and "N=3" when "K=12" and "I=2", or
"L=0", "M=2", and "N=2" when "K=16" and "I=2", or
"L=0", "M=2", and "N=3" when "K=24" and "I=2".

16. An electronic instrument comprising:
the data transfer control device as defined in claim 15; and
the host device connected with the data transfer control device through the system bus.

17. A data transfer control device that controls data transfer, the data transfer control device comprising:
an interface circuit that performs interface processing between the data transfer control device and a host device connected with the data transfer control device through a system bus; and a link controller that analyzes a packet received through a serial bus and outputs data to the interface circuit, one data unit of the data being K bits (K is an integer of two or more), (N×I)-byte (N and I are integers of one or more) packed data being inserted in a data field of the packet received through the serial bus, the (N×I)-byte packed data containing M (M is an integer of one or more) pieces of (K+L)-bit data, the (K+L)-bit data being obtained by adding L bits (L is an integer of zero or more) of dummy data to the K-bit data, the (N×I)-byte packed data L and M being variably set corresponding to K, and the link controller including a data formatter that extracts the K-bit data from the (N×I)-byte packed data and outputs the K-bit data to the interface circuit, "N×8×I=(K+L)×M" being satisfied.

18. An electronic instrument comprising:
the data transfer control device as defined in claim 17; and
the host device connected with the data transfer control device through the system bus.

* * * * *